United States Patent
Waldner (10) Patent No.: US 9,861,106 B2
(45) Date of Patent: Jan. 9, 2018

(54) WHOLE GRAIN NON-FLOUR BAKING PROCESS

(71) Applicant: MARY'S GONE CRACKERS, INC., Gridley, CA (US)

(72) Inventor: Mary Waldner, Paradise, CA (US)

(73) Assignee: Mary's Gone Crackers, Inc., Gridley, CA (US)

( * ) Notice: Subject to any disclaimer, the term of this patent is extended or adjusted under 35 U.S.C. 154(b) by 171 days.

(21) Appl. No.: 13/926,914

(22) Filed: Jun. 25, 2013

(65) Prior Publication Data

US 2014/0023768 A1   Jan. 23, 2014

Related U.S. Application Data

(60) Provisional application No. 61/672,731, filed on Jul. 17, 2012.

(51) Int. Cl.
*A21D 8/02* (2006.01)
*A23L 7/10* (2016.01)

(52) U.S. Cl.
CPC .............. *A21D 8/02* (2013.01); *A23L 7/197* (2016.08); *A23V 2200/264* (2013.01)

(58) Field of Classification Search
CPC ...... A21D 13/04; A21D 13/066; A21D 13/02; A21D 10/007; A21D 10/00; A21D 10/04; A21D 10/002; A21D 8/02; A21D 8/00; A21D 8/025–8/047; A23L 7/197; A23L 7/1975; A23V 2200/264
USPC .............. 426/496, 504, 549, 552, 557, 653, 426/506–511, 519, 459, 461, 462, 463, 426/94, 658, 550, 661
See application file for complete search history.

(56) References Cited

U.S. PATENT DOCUMENTS

| | | | |
|---|---|---|---|
| 3,259,503 A * | 7/1966 | Tan et al. | 426/559 |
| 3,800,050 A * | 3/1974 | Popel | 426/550 |
| 4,643,904 A * | 2/1987 | Brewer et al. | 426/549 |
| 6,025,011 A * | 2/2000 | Wilkinson et al. | 426/622 |
| 6,827,965 B1 | 12/2004 | Fitzpatrick | |
| 7,829,128 B2 * | 11/2010 | Karwowski et al. | 426/94 |

(Continued)

FOREIGN PATENT DOCUMENTS

| | | |
|---|---|---|
| WO | 95-10969 | 4/1995 |
| WO | 2011-139906 | 11/2011 |

OTHER PUBLICATIONS

"Shaffer Mixers" ("Dough Pump"), pub. May 21, 2012. http://web.archive.org/web/20120521004525/http://www.shaffermixers.com/products/dough-pump.*

(Continued)

*Primary Examiner* — Erik Kashnikow
*Assistant Examiner* — Lela S. Williams
(74) *Attorney, Agent, or Firm* — Marsh Fischmann & Breyfogle LLP; Kent A. Fischmann (57) ABSTRACT

A system is provided for producing gluten-free, vegan products at an industrial level. In one implementation, a vat system (200) includes a paddle assembly (202), a blade assembly (206) and steam-lined kettle (210). Whole grains and water are added in a certain order to the vat and heated to cook the mixture. As the mixture is cooking, the blade assembly (206) chops the grain and the paddle assembly (202) mixes the grains and water into a specific texture. The result is a cooked grain product that can be used like a dough in forming a variety of baked goods.

22 Claims, 3 Drawing Sheets

(56) References Cited

U.S. PATENT DOCUMENTS

2008/0003340 A1     1/2008    Karwowksi et al.
2011/0027421 A1*   2/2011    Stratakis ........................ 426/62
2011/0290121 A1    12/2011    Taguchi

OTHER PUBLICATIONS

"About" ("Gluten Free Pizza"), pub. May 12, 2011. http://web.archive.org/web/20110512021848/http://dairyfreecooking.about.com/od/pastagrainspizza/r/Gluten-Free-Pizza.htm.*
"Allrecipes" ("Gluten-Free Hot Breakfast Cereal"), pub. Mar. 13, 2011. http://web.archive.org/web/20110313172625/http://allrecipes.com/Recipe/Gluten-Free-Hot-Breakfast-Cereal/Detail.aspx.*
"Food4Celiacs" ("Mary's Gone Crackers"), pub. May 17, 2008. http://web.archive.org/web/20080517125756/http://www.food4celiacs.com/ShopOnline/300/300MGC.html.*
"LadyStiles" ("Gluten-Free Irish Soda Bread for Bread Baking Babes"), pub. Jun. 21, 2011. http://ladystiles.blogspot.com/2011/06/gluten-free-irish-soda-bread-for-bread.html.*
Muchová et al. ("New Approach to the Study of Dough Mixing Process"), Czech J. Food Sci., vol. 28, 2010, No. 2: pp. 94-107. http://www.agriculturejournals.cz/publicFiles/31626.pdf.*
"Mother Earth" ("Gluten-Free Challenge: Brown Rice Crust"), pub. Apr. 25, 2011. http://www.motherearthnews.com/real-food/gluten-free-crusts-zb0z11zkon.aspx#axzz2y38FNW8t.*
"Artisan Bakers" ("Crumb"), pub. Apr. 20, 2008. http://web.archive.org/web/20080420150439/http://www.artisanbakers.com/crumb.html.*
Michaels, Coconut Flour Bread (http://www.cheeseslave.com/coconut-flour-bread/) Nov. 2008.*

* cited by examiner

WHOLE GRAIN NON-FLOUR BAKING PROCESS

RELATED APPLICATION INFORMATION

This application claims priority to U.S. Provisional Application No. 61/672,731, entitled, "WHOLE GRAIN NON-FLOUR BAKING PROCESS," filed on Jul. 17, 2012. The contents of which is incorporated herein as if set forth in full and priority to this application is claimed to the full extent allowable under Unites States law and regulations.

FIELD OF THE INVENTION

The present invention relates generally to equipment and processes for producing baked goods on an industrial scale and, in particular, to equipment and processes for handling unconventional doughs and batters, such as gluten-free, vegan doughs and batters, that have properties that differ markedly from traditional baking.

BACKGROUND

As demand increases for "gluten-free," "wheat-free," "dairy-free," "egg-free," "allergy friendly," "vegan," and other specialized baked goods to support elimination diets, manufacturing companies in the food industry are challenged to create products and baking processes that successfully fulfill these new marketplace demands. These increasingly popular products often require unique culinary talent, specialized food science, and product formulations that require the invention of new bakery manufacturing equipment and baking processes.

Because it has been difficult to create successful new industrial scale products for elimination diets, many of these new specialty baked goods were originally created and packaged by hand in small baking operations. However, as demand has continued to grow, automation to one degree or another has become necessary. Similarly, the "art of baking" gluten-free and vegan cuisine is a work in progress that has required significant invention to create successful products that are both nutritious and appetite-appealing.

While many consumers want or need these new baked goods, it is often hard for them to find products which taste good and are likely to become a part of their continuing diet. Early gluten-free and vegan baking solutions often involved the creation of non-traditional flour that removed the unacceptable ingredients. "Gluten-free" flour, "wheat-free" flour, and "dairy-free" products emerged and were often used within what came to be called a "replacement model." In this approach, the flour within a traditional baking recipe was "replaced" with a gluten-free or non-wheat flour (other grains besides wheat that include gluten are barley, rye, triticale, kamut, and spelt), to produce an often marginally acceptable baked product that lacked appetite-appeal and failed to deliver culinary satisfaction. Nevertheless, for many, there were no other alternatives.

For celiacs, individuals who suffer from a lifelong inherited autoimmune condition known as "celiac disease," food was an ongoing problem. Today, celiac disease affects millions of children and adults, limiting their culinary options, negatively impacting their ability to obtain good nutrition, curtailing their social life, and affecting their entire lifestyle. Recent statistics suggest that at least 1% of the U.S. population has the disease, while another 6% of the population suffers from non-celiac gluten sensitivity or intolerance. For celiacs, eating gluten containing products is replete with negative symptoms and damage to their small intestines that prevents food and nutrients from being properly absorbed into their systems. For these individuals, and the many others who are allergic to wheat or dairy products, the daily question remains, "what can I eat?"

To meet the needs of these individuals is challenging. To this day, most gluten-free product manufacturers consider it adequate to remove gluten, and, in fact, many gluten-free products are not nutritious, all-natural, or organic. Despite the fact that celiacs are nutritionally challenged, and in need of digestible dietary nutrition, there are few products that deliver high nutrition while also being gluten-free, wheat-free, dairy-free, and vegan. Yet, for health, ethical, and social reasons, many consumers need to eliminate gluten, wheat, dairy, animal products, and other substances that naturally occur in traditional bakery offerings, but that cause disease, intolerance, allergic reactions, or offend modern ecological or ethical sensibilities, giving cause to the imperative for "gluten-free" and "wheat free" baked goods.

SUMMARY

To meet the needs of these important emerging markets, the invention herein disclosed was developed to create highly nutritious, appetite-appealing, gluten-free, wheat-free, dairy-free, and vegan products that could be manufactured at an industrial level. The invention provides a way to deliver substantial nutrition from whole grain, and can do so within the framework of an extensive range of elimination diets. The invention successfully combines both culinary and technical creatively to provide highly nutritious, all-natural and organic gluten-free vegan products that taste good, as well as equipment, processes, and methodologies that allow them to be produced on an industrial scale.

The development of these products requires an extensive understanding of food science, new approaches to product formulation, unusual new ingredients, and innovative manufacturing methods. Most notably, the elimination of traditional baking ingredients such as wheat, barley, rye, butter, milk, and eggs causes manufacturing problems unforeseen in traditional bakery manufacturing. As these customary basic ingredients are central to the baking tradition, it is difficult to produce baked goods, such as cookies, crackers, and pretzels, without using the traditional wheat ingredients, which contribute gluten, or dairy products, such as milk and eggs, which provide texture, emulsification, cohesion, and a desirable general product character.

Long-standing baking knowledge and manufacturing technology is based in large part on the gluten properties of wheat based products and the natural ability to emulsify oil and water that is provided by eggs and gluten. Non-traditional, gluten-free substances such as brown rice flour, quinoa, nut flours, and dried vegetable flours all create substantially different products that require new recipes, manufacturing equipment, baking methods, and processes. In particular, conventional production equipment is often inadequate to deal with the increasingly complex and difficult to manufacture dough that is created for gluten-free or vegan products. Uncommon product ingredients, coupled with the absence of gluten-containing flours and eggs, often result in lumpy, tough, and inflexible dough which requires either the use of unacceptable ingredients or an entirely different manufacture.

The present invention advances the art of making of gluten-free, wheat-free, dairy-free, and vegan products by moving beyond traditional recipes created under the "replacement model" to create a whole new approach to baking gluten-free, vegan baked goods. While novel at the beginning, products that merely replace a traditional flour, egg, or dairy product with a specialty flour and replacement ingredients have often failed to create either nutritious products satisfying to consumers or those easy to manufacture. The "whole grain, non-flour baking" equipment and processes of the present invention entail a new approach applicable to specialty baking for elimination diets, which results in:

1) a whole grain product that retains a fuller complement of the nutritional substances available in grain;

2) a more acceptable end product that is appetite appealing and satisfying to both those who need and want these products; and 3) a different approach to the industrial preparation and manufacturing of elimination diet dough or batter.

1. The "Whole Grain, Non-Flour" Approach

The "whole grain non-flour" approach is believed to be nutritionally superior to milling and processing flour. Conventional "whole grain" flour, while retaining more nutritional value than does "white flour," suffers because the refining or milling process granulates and powders the whole grain leaving the nutrients in the processed flour open to oxidation resulting in a loss of dietary fiber, antioxidants, B vitamins, healthy fats, iron, protein, and other vitamins and minerals. In fact, it is believed that any processing of the whole grain erodes its nutritional value.

In the "whole-grain" method, unprocessed "whole grains" are utilized that are preferably fully intact, completely whole, not machined or handled, and their nutrients are significantly less susceptible to either depletion or oxidation. Whole grains are more nutritious than milled grains. It is for this reason that the inventor experimented to invent non-flour, whole grain baking. This new approach to baking retains the maximum possible nutritional value available in a respective grain by avoiding milling, machining, or unduly handling the grain.

2. Appetite Appeal and Culinary Satisfaction

The present invention moves beyond the gluten-free ingredient and flour replacement approach and rethinks both baking methodologies and ingredients to deliver alternative elimination diet products that generally perform as do traditional baked goods. Replacement method gluten-free flour mixtures are replaced in accordance with the present invention, by a low density mixture that allows even-handling through depositor equipment, shaping and finishing equipment, and more homogenous control in baking ovens and packaging equipment.

Much of the culinary unsuitability of current replacement model gluten-free products is associated with the absence of a well developed gluten-free cuisine. Thus swapping out one flour for another flour (or group of flours) with totally different characteristics requires rethinking the whole recipe to figure out how to create a product that meets consumer expectations under an entirely new model. Traditional baking is based upon a generations-old, wheat flour-based, emulsion baking model. The present inventor has recognized that gluten-free vegan cuisine must be rethought from the ground up to deliver alternative products that meet traditional expectations.

Additionally, the replacement model can result in dough that sacrifices an all-natural or organic product profile to obtain machinability through the addition of ingredients, such as gums, or oils or other highly processed binders. The non-flour baking approach disclosed herein incarnates a gluten-free vegan cuisine that is designed to deliver a fully organic product made with whole ingredients that are characterized by high nutritional benefit, flavor, appetite-appeal, and a culinary functionality that performs well in a variety of eating occasions, delivering gustatory satisfaction.

3. Manufacturability

Broadly speaking, the traditional gluten levels, such as found in wheat flour, create light dough with oil and water combined, contained, and fully emulsified and texturized by the gluten and any eggs or dairy products that are used in the recipes. Thus traditional gluten-containing dough has a low density, a low level of stickiness, and a light, airy texture. Accordingly, traditional gluten flour dough rolls along over itself when it is mixed or kneaded in vats, and typically spreads to each corner when it is poured into a hopper, uniformly filling and feeding all openings evenly.

Gluten-free or vegan doughs and batters can be very different from conventional doughs and batters in their properties and behavior in the baking process. Traditional preparations spread evenly, uniformly, and predictably to form the natural shapes of cookies and crackers often without any extra manufacturing effort. Gluten-free dough is thicker, denser, often tacky or sticky and may sit immobile in depositor equipment or in a jagged heap on a baking sheet and often tear, break apart and/or start leaking water because it lacks any effective emulsifying agent to hold it together or to lend it coherence. Because gluten-free products do not take a ready-to-bake shape when placed on the baking sheet, it is often necessary to shape and finish each baked good for baking.

Further, in baking ovens there may be less rise to the gluten-free dough as one would expect in gluten baking, and the irregular shapes with varying degrees of thinness and thickness are hard not to overcook or undercook as the baker seeks some homogenization for baking success. It is easy to see when traditional wheat baked goods are ready to be removed from the oven, but gluten-free baking signals do not include product rise, Maillard browning, or unequivocal visual evidence of particle crispness. In gluten-free baking, one waits in vain for browning, seeking only nearly imperceptible shifts in texture which hint at a later to be seen crispness, which does not show until the items are removed from the oven and have been set aside to cool for packaging.

Each of these issues is critical in creating and manufacturing non-traditional baked goods for gluten-free and vegan diets. Nutrition is important, because celiacs are often nutrition-deprived. Appetite appeal is important because it is hard to create a product which can become a permanent part of the gluten-free vegan lifestyle. And the presentation of the final product is necessary to ensure that it looks like traditional baked goods and that it can be used with traditional spreads and toppings. Crackers, for instance, need to be flat and stable enough to take toppings, just as cookies need to have a crunch or a crumb to them and be fun to eat. Much of the goal is to create a product that seems like a wheat-based gluten-containing flour product and seems like nothing has been removed. The person on the restricted diet knows what does not work well in their body has been removed, but it seems like they are eating regular crackers, cookies, or pretzels.

According to one aspect of the present invention, a method is provided for making gluten-free baked products. The method includes: 1) combining whole, gluten-free grains and water in a vat; 2) cooking and mixing the grains and water to form a cooked grain product having a texture like a low density dough or thick batters; and 3) pumping the cooked grain product from the vat to depositor equipment for deposition on baking surfaces such as trays. The step of mixing involves simultaneously operating grinder blades to grind the solids and mixer paddles to circulate the mixing ingredients. As described above, the process is carefully controlled to form a cooked grain product of the proper viscosity that can be readily pumped and handled by the depositor equipment.

In a preferred implementation, the water is first added to the vat, then the grains are added and heated prior to and/or during mixing. For example, a kettle of the vat may be filled to about 25%-29% of the tank capacity with water and then the grains may be added. In a specific implementation, a 1000 gallon tank is used and about 290 gallons of water are added depending on certain conditions as discussed below. Thereafter, about 2000 pounds of organic, short grain brown rice and about 550 pounds of quinoa are added. The mixture is then heated to a temperature of between about 200° F.-212° F. and cooked by operation of a steam lined kettle.

The heated mixture is then mixed for a period of time, thus allowing for cooking of the mixture, while operating the blades and paddles. This may involve an initial mixing process where the blades and paddles operate at a higher speed and subsequent mixing process where the blades and paddles are operated at a somewhat reduced speed. After this initial mixing process, additional ingredients may be added and a subsequent mixing process may ensue. After the subsequent mixing process, water may be added to the mix to bring the mix to a desired ratio of water to other ingredients. For example, the water may be added in increments while mixing. In one implementation, the desired ratio is approximately 460 gallons of water for 2000 pounds of other ingredients. Once the desired ratio is achieved, a final mixing process ensues. The mixture may be inspected to ensure the proper consistency before pumping to the depositor equipment. The depositor equipment is then operated to deposit the cooked grain product onto baking trays or other surfaces and the cooked grain product is then baked to form the desired baked products.

BRIEF DESCRIPTION OF THE DRAWINGS

For a more complete understanding of the present invention and further advantages thereof, reference is now made to the following detailed description, taken in conjunction with the drawings, in which.

DETAILED DESCRIPTION

In the following description, the present invention is set forth in the context of specific formulations and processes for producing a cooked grain product which is an intermediary product that can be used to produce a final baked product such as various vegan and gluten-free cookies, crackers, pretzels and the like. Depending on the baked product being produced, additional ingredients may be added, the specific formulation and production of the cooked grain product may be varied (e.g., the proportions of the grain and water as well as the cooking parameters may be varied), and additional equipment (such as a shaping and finishing machine) may be provided in the baking line. Additional details of such a baking line, including a deposi-tor machine and a finishing machine, are disclosed in U.S. patent application Ser. No. 13/360,401, entitled, "HIGH-VISCOSITY DOUGH DEPOSITOR MACHINE," filed on Jan. 27, 2012, and U.S. application Ser. No. 13/706,238, entitled "CRACKER FINISHING MACHINE," filed on Dec. 25, 2012, both of which are incorporated herein by reference. It will be appreciated that the description below thus sets forth particular processes and equipment for producing a cooked grain product and using that product in a baking process but the invention is not limited to this exemplary disclosure.

The Whole Grain, Non-Flour Baking Process of the present invention arises from the need to create a superior baked product that eliminates the appropriate ingredient(s) from the daily diet, and yet tastes great, possesses maximal nutritional content, and allows the individual to make the elimination diet (e.g. gluten-free, wheat-free, dairy-free, or vegan) an enjoyable and effective part of their lifestyle. In this invention, the inventor has avoided the entire "replacement model" to conceive of a new non-flour approach to specialty baking that produces a superior food product. The inventor has experimented with many approaches to creating nutritious, dry food products (e.g. crackers, cookies, and pretzels) that could be used to supplement meals, act as a snack food, or provide sustenance and enjoyment for individuals who must practice an elimination diet.

Interestingly, the products produced under this invention are also suggestive of other culinary uses. For instance, these particular gluten-free products, in the absence of oil or egg emulsification, evidence a long shelf-life in situations where spoilage would traditionally be an issue and they do not go stale. Similarly, non-flour products do not readily oxidize their nutritional content.

As previously mentioned, most gluten-free, wheat-free, dairy-free or vegan products use traditional baking recipes and just swap out the problematic ingredients and replace them either by weight or in a "cup for cup" approach with other ingredients. Thus, in these approaches, regular flour would be replaced with a similar amount of "gluten-free" flour. This approach also frequently involves inserting an ingredient, such as powdered milk or arrowroot powder, to replace the lost function of a traditional ingredient, such as eggs, for emulsification. It is frequently the case that the additional replacement ingredients bring little or no nutritional value to the end product and that also compromise culinary enjoyment to achieve manufacturability. In each case, the structure of the recipe is assumed and uncritically accepted, and the baker hopes that the result will be comparable to the baked goods produced in traditional gluten-containing baking. This invention, while originating as a solution to a gluten-free diet, goes beyond any ingredient-elimination diet per se, to offer a methodology for how to turn cereal, grain, (dried) vegetables, seeds, or other gluten-free ingredients into a baked grain product suitable for forming baked products while simultaneously innovating a new, more nutritional preparation method or approach to baking.

The invention is driven by the exigencies involved in preparing and baking elimination diet baked goods. Earlier methods have struggled to produce well-baked cuisine equal to that found in traditional baking. Given the extensive experimentation that has been undertaken in developing "non-flour" based procedures and baking methodologies, and how counter-intuitive it is to imagine baking "without flour," it is unlikely that food scientists, engineers, or bakers skilled in the art of traditional baking would contemplate the equipment or processes described below or the results thereby achieved.

Whole Grain Non-Flour Baking Process

The wet and the dry ingredients in each gluten-free vegan product are prepared and combined in an industrial mixing vat that is fitted with internal apparatuses that are adequate for hydrating, stirring, cooking, blending, pureeing, and in general combining materials and expelling them for transport. In particular, a specially devised mixing vat is used including a steam-lined kettle that allows the contents to be cooked, an internal stirring arm that sweeps through the mixture homogenizing its ingredients, and built-in food processor blades that allow the mixture to be pureed as needed.

Figure 2:
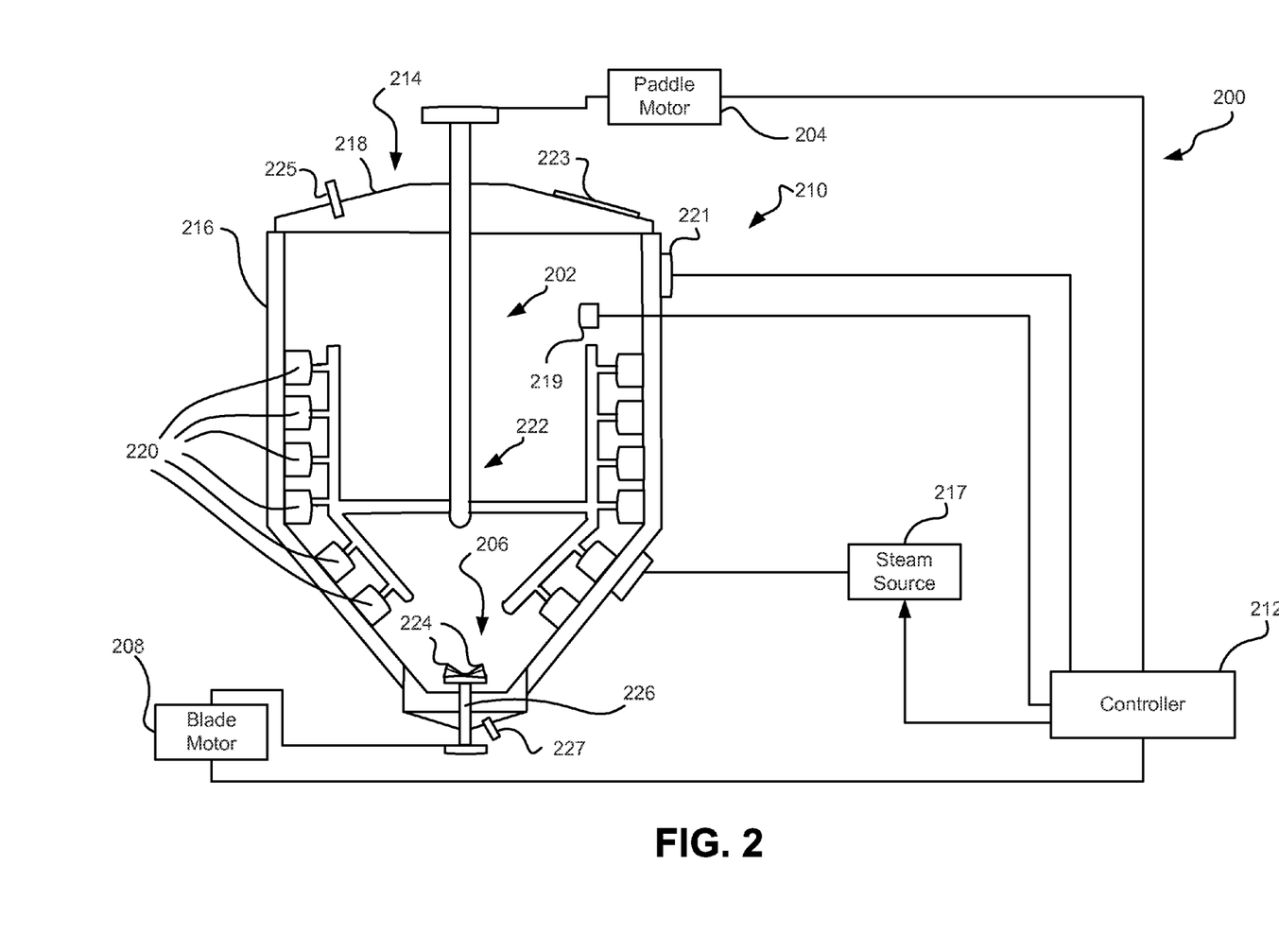
FIG. 2 is a schematic diagram of a mixing and cooking vat used to produce the critical cooked grain product in accordance with the present invention.

A preferred vat system 200 is shown schematically in FIG. 2. The illustrated vat system generally includes a paddle assembly 202 driven by paddle motor 204, a blade assembly 206 driven by blade motor 208 and a steam-lined kettle 210. The motors 204 and 208 are separately controlled by one or more controllers 212, e.g., one or more computer based systems configured with logic (hardware, software and/or firmware) operative to perform the functionality described below. The illustrated controller 212 includes user interface elements (not shown) such as dials, or other mechanical or software-based inputs, that allow a user to independently select the operating speed (e.g., in hertz) of the paddle assembly 202 and blade assembly 206. The controls may also allow the user to set an operating temperature of the steam-lined kettle 210, a time period for each cycle and any other processing variables.

The steam-lined kettle 210 includes a tank 214 surrounded by a liner 216. The illustrated tank 214 has a working volume of about 1000 gallons. The liner 216 is hollow such that steam, from a boiler or other source 217, can be circulated through the interior of the liner 216 to heat the contents of the tank 214. In this regard, a thermometer 219 is provided in the tank 214 to provide feedback to controller 212 regarding the temperature of the contents so that heating can be regulated (e.g., by selectively controlling the source 217 and/or vents 221 to allow venting of the steam). A cover 218 can be opened, e.g., at port 223 to allow addition of non-water ingredients (e.g., organic, gluten-free whole grains and seeds). Openings 225, 227 and associated tubing and pumps allow for introduction of water and evacuation of cooked grain product from the tank 214.

The paddle assembly 202 includes a number of paddles 220 mounted on a rotating frame 222 that is turned by the paddle motor 204. The geometry of the frame 222 and paddles 220 is such that the paddle ends are in near or actual contact with the walls of the tank 214. Accordingly, the paddles 220 effectively scrape any grain clumps or particles from the tank wall back into the tank interior. The frame 222 and paddles 220 are effective to mix the contents during cooking as described below.

The blade assembly 206 includes a number of chopping blades 224 mounted on a rotating shaft 226 that is turned by blade motor 208. The lower tank and blades 224 are configured such that any clumps of grains or other solids settle in the tank and thereby come into contact with the blades 224, thereby breaking up the clumps. The combination of the action of the blade assembly 206 and paddle assembly 202 is effective to form a substantially homogeneous cooked grain product as described below.

As well, the combination and maturation of selected ingredients involve experienced supervision and attention to ensure proper development of the cooked grain product for manufacturing purposes.

The Method

As noted above, an objective of the inventive process is to produce a "cooked grain product" that is 1) an acceptable product for gluten-free diets (and, preferably, for other elimination diets including dairy-free and vegan diets), 2) that is satisfying and nutritious, and 3) that allows for handling by manufacturing equipment and 4) is consistent, repeatable, and scalable on a commercial scale. The process described below meets those objectives and results in a cooked grain product characterized by a mush with grain chunks that are uniformly distributed therein. The grain chunks are about 20% the size of a full grain at the end of the process, and the cooked grain product can be transported from the vat to a dough depositor machine by pumping, and then deposited on baking sheets by the depositor machine, all without settling of the grain chunks or otherwise leaving the grain chunks behind during transport of the cooked grain product.

As described below, the desired cooked grain product is achieved, in the presently preferred implementation, by a multi-stage process that has been developed in part through experimentation over time. Among other things, this process is believed to achieve an optimal balance between minimizing processing of the grains with attendant risk of degrading the nutritional value of the grains and achieving a cooked grain product meeting all of the objectives noted above. Accordingly, a specific multi-stage process is described below that involves specific temperatures, times, operating speeds, quantities and the like. It should be noted, however, that these process parameters are, to some extent, interdependent. For example, cooking time may depend on temperature, and both time and temperature (as well as optimal operating speeds) may vary depending on the grain or grain mix employed. Moreover, the consistency or viscosity of the cooked grain product may be varied for different products, e.g., crackers, cookies, pretzels, etc., depending, for example, on the desired moistness or dryness. Of course, added ingredients may change depending on the specific recipe. Accordingly, specific values and sequences set forth below may be varied and still yield an acceptable product for certain purposes.

Figure 1:
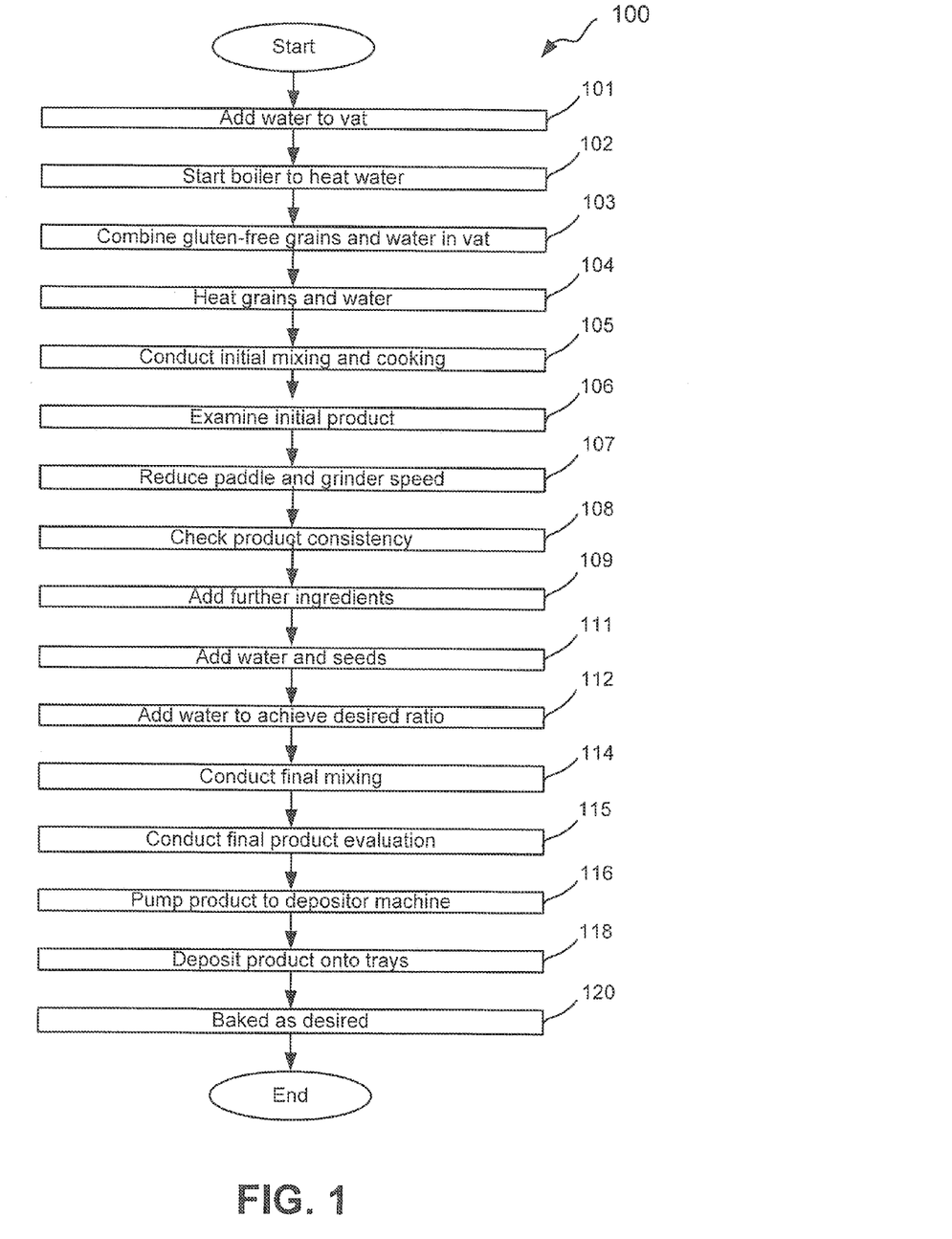
FIG. 1 is a flowchart showing a manufacturing process in accordance with the present invention.

The preferred process 100 is illustrated in FIG. 1. First, water is added (101) to the vat. Specifically, the process 100 may utilize, in one example, a 1000 gallon steam-lined kettle. The kettle is filled with 250-290 gallons of water (25%-29% of the tank capacity dependent upon the season of the year and weather conditions). Then the boiler or steam generator is started (102) and the water is brought up to its operating temperature of at least about 206° F. and, most preferably, about 208° F. The objective is not to boil down the mix, but yet to cook the mix within practical and optimal manufacturing times. At this time, the puree grinder is set to about 75 hertz and the mixing paddles set to about 70 hertz as designated by controls that range from 0-100 hertz of frequency.

Whole grains are then combined (103) with the water in the vat and heating (104) ensues. In a preferred implementation, 2000 pounds of organic short grain brown rice and 550 pounds of quinoa are added and stirred into the water. In some recipes, other grains such as millet and amaranth may also be added. The mixture is stirred and cooked (105) for at least about 12 minutes, for example, 12-13 minutes, with careful attention to its textural quality and homogeneity. The objective is to be sure that all the grain surfaces have been hydrated. At this stage, a sensory examination (106) should reveal that the cooked grain product is getting soft and that the taste of the rice on the tongue is starchy.

Essential to the success of this non-flour baking methodology is pureeing the whole grains to just the right consistency to create a "cooked grain product" that can be pumped through pipes and into the manufacturing process with optimal performance. The whole approach of using a lidded steam lined mixing vat, with its respective apparatus, and cooking the mixture, and then transporting the final mixture through pipes to depositor equipment is believed to be unique in the baking industry. Largely, the traditional baking approach, as in the instance of making crackers, stirs the wet and dry ingredients together in an open container to create a dough, and then kneads the dough until it is ready. At that point the dough is run through rollers to flatten it to an appropriate thickness, and then it is cut into its shape for baking.

As it is critical, in the inventive process, to maintain optimal nutritional content, the puree activity is kept to an absolute minimum so as to keep the grains as unprocessed as possible and yet to achieve the proper level of viscosity. The quality of the perfectly prepared mixture, while difficult to characterize, includes careful attention to the particle size. The mixture is blended and pureed to homogenize the product and cooked until it gets a creamy smooth, mush-like texture that still has many pieces of chopped whole grain, measuring 1-2 mm in size. These whole grain particles assist in holding the product together as it is further processed. That is, the inventor believes that it is this pureed part of the cooked grain product that acts as the glue that holds the product together. At this stage the starch in the mixture will be starting to thicken. Achieving this state is an important part of the methodology. As many of the ingredients used in this methodology are selected for their nutritional content, this technique delivers higher nutritional value and, in particular, higher levels of protein, vegetable omega 3 fatty acids, beneficial fiber, and possibly enhanced immune benefits.

After the initial stirring process of about 12-13 minutes, the grinder and especially the paddles are slowed (107). The grinder blades are slowed substantially, preferably to less than half the speed used for initial stirring. The paddles are also slowed, though by a lesser amount. In a process that has been found to yield excellent results, the grinder is set to 20 hertz and the paddles are set to 50 hertz for 25 minutes.

After 25 minutes, the rice mixture is checked (108) for proper consistency and evidence of a white point on the end of the whole grain brown rice kernels. Once the "white point" symmetrically caps the more pointed end of the brown rice kernel, it signals to the food technician that it is time for the next step in the process. This "white point" is an important aspect of the methodology, and is a critical aspect of proper timing and, importantly, proper preparation as it signals that the hull on each brown rice kernel is about to break forth and extrude starches and sugars, such as maltodextrin and other short-chain carbohydrates which greatly impact the desirable flavor of the final product.

At this point, the food technician watches the mixture closely for the white point on the rice to fade and disappear. At that moment, the technician conducts a tasting and a sensory evaluation of the mixture. The rice should be soft, well-cooked, and have a starchy taste. A visual assessment is conducted, and the mixture is held in the hand and mashed to determine softness and to inspect and see that the rice kernel shape is still visible while the quinoa kernels are only slightly visible or have dissolved into the mixture giving it a light yellow color. At this stage the viscosity of the mixture would be a 5 on a scale with 1 being free-flowing, and 10 being thick and oatmeal like. As well, the consistency would a 4 on a scale with 1 being "particulate" and 10 being "creamy."

At this time, the next wave of ingredients is added (109) which may include, for example, salt, wheat-free tamari soy sauce, and any flavor seasonings such as onion, black pepper, caraway, rosemary and/or garlic as dependent upon the individual product being produced. In one implementation, the food technician turns off the steam jacket and after 5 minutes, the food technician adds (111) 60 gallons of water, then whole flax and whole sesame seeds may be added for flavor and to enhance nutritional value. The addition of flax, in particular, may increase the "gumminess" of the cooked grain product mixture, but the cooked grain product can be made without either the flax or the sesame seeds to the same effect. The ingredients are then allowed to mix for example, about 18 minutes.

Thereafter, water is added (112) incrementally until a desired ratio of water to the other ingredients is achieved. In a preferred process, 40 gallons of water is added every 40 seconds until total water has reached 460 gallons for 2000 pounds of rice and other ingredients. Adding water in this pattern is important to the methodology and obtaining a properly mixed cooked grain product with the best consistency. The inventor conducted many tests to find the best time and proportioning for cooked grain product consistency of the right texture. If the water is added too fast, the mixture clumps forming dry chunks, and if water is added all at once, the dough becomes too thin and diluted.

A further mixing process (114) is then conducted, this time with slower operation of the blades but higher paddle speeds. This mixing may be conducted for at least about 20 minutes, for example, about 23 minutes with the grinder set at 15 hertz and the paddles set at 60 hertz. Here the intent is to bring the mixture to a specific texture. With said texture, the viscosity has thickened to a 9 or 10 on a 10 point scale, and it is a very creamy mush. The food technician also conducts another taste test and a sensory evaluation (115) at this point. The ingredients should be fully cooked and have a salty starchy taste, and the seeds in the mixture should "pop" lightly when chewed. The mixture should be a medium brown color and very slightly sticky to the hand (clumps adhere but can largely be shaken off). The cooking and mixing process is then complete, though the paddles and blades preferably continue to operate as the tank is emptied via pumping from a port located at the bottom of the tank.

Once complete, the operator rapidly pumps (116) the mixture of whole cooked grains, or "cooked grain product," out of the bottom of the mixing vat through stainless steel pipes to the appropriate dough depositor equipment for placement (118) on baking trays, any finishing, and transport through the bakery manufacturing process where the desired products are baked (120).

The goal is for the mixture to be in the cooking kettle for the shortest time possible. If cooked too long or just allowed to stay in the kettle too long, it becomes gooey and harder to handle. Therefore, much of the art of this methodology depends on critical timing and discerning judgment regarding the quality and texture of the mixture at any particular point.

In order to demonstrate and quantify the effects of the cooking process described above, technicians of Applicant completed a first mixture analysis profile when the grains and water were initially combined (corresponding to step 103 above) and a second mixture analysis profile at the completion of the initial cooking process when the cooked product was ready for pumping to the depositor machine (corresponding to step 116 above). Specifically, in each case, the technician extracted a sample of the product and analyzed the product for viscosity, taste, and consistency. The analysis for each characteristic was based on a ten point scale.

In the case of viscosity, the ten point scale was defined such that "0" corresponded to a thin, free flowing liquid whereas "10" corresponded to a thick, oatmeal like product. On this scale, the first mixture analysis profile (when the grains and water were first combined) yielded a viscosity of 5 whereas the second mixture analysis profile (after cooking) yielded a viscosity of 10, thus demonstrating substantial thickening of the product by the completion of cooking.

The taste scale was defined such that "0" corresponded to hard, uncooked seeds with little discernible taste whereas "10" corresponded to cooked and softened seeds with a starchy, salty flavor. The first mixture analysis profile yielded a 4 on this scale and the second mixture analysis profile yielded a 9. It was further observed that the cooked seeds "pop" when chewed.

Finally, the consistency scale was defined such that "0" corresponded to a rough, particulate mixture whereas "10" corresponded to a creamy, non-sticky mush. The first mixture analysis profile yielded a 4 on this scale, whereas the second mixture analysis profile yielded a 10. It will be appreciated that other combinations of times, temperatures and other parameters may be possible to achieve the desired cooked product having these characteristics.

Figure 3:
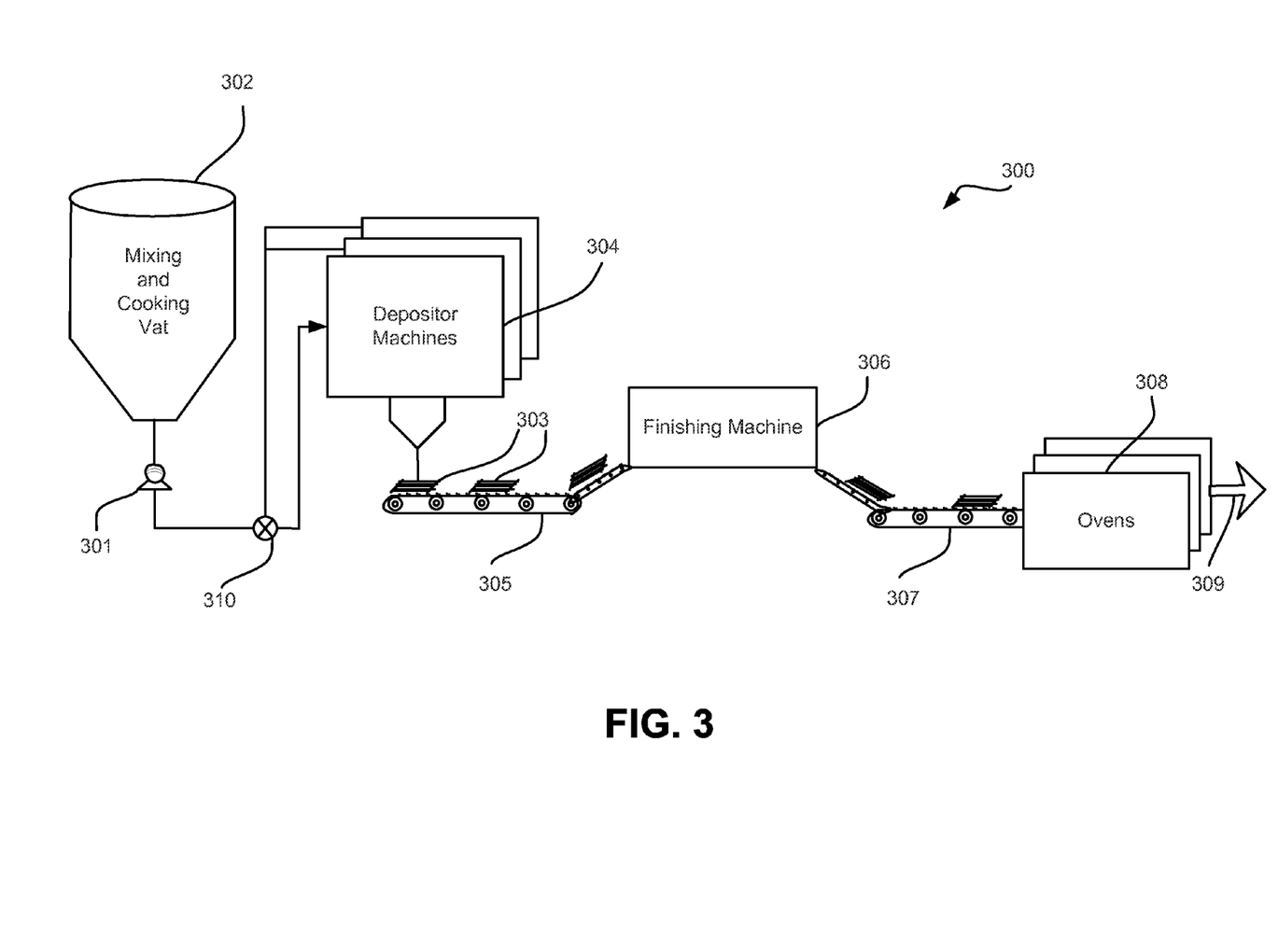
FIG. 3 is a schematic diagram illustrating a gluten-free baked goods production line in accordance with the present invention.

FIG. 3 illustrates a full production line for use in manufacturing gluten-free baked products in accordance with the present invention. The illustrated production line 300 begins with a mixing and cooking vat 302. As described above, whole grains and other ingredients are combined with water and cooked (while stirring and chopping) in the vat 302 to produce a cooked grain product. In particular, this complex apparatus is essential to producing the multi-step texture of the mixture and is the result of substantial experimentation and invention. The cooked grain product is then pumped to one or more depositor machines 304. In this regard, a pump 301 may be used to pump the cooked grain product from the vat 302 to the depositor machines 304, and a juncture 310 in the line may allow for directing the product to various machines 304. The depositor machines 304 are operative to deposit appropriate size portions of the cooked grain product in a desired pattern on baking trays 303. The size of portions and the pattern of the portions depend on the type of product being produced. In the case, for example, of cookies or crackers, small lumps of the product may be arrayed in columns and rows on the baking trays 303.

A first conveyor 305 is then operated to transport the baking trays 303 to a finishing machine 306. As discussed above, gluten-free and vegan products may behave very differently from conventional gluten containing doughs or batters. In particular, whereas traditional doughs or batters typically assume the desired shape for baking without further processing, gluten-free and vegan products, in accordance with the present invention, may require processing by a finishing machine 306 to press, cut and/or shape the product to provide a shape and uniform thickness for optimal baking. Such functions can be performed by the finishing machine 306 by pressing the portions of the product deposited on the baking tray. The finishing machine 306 may also be used, for example, to spray a coating of oil on the products to further assist in baking and yielding a desirable end product.

From the finishing machine 306, the baking trays 303 are deposited on a second conveyor 307 that transports the trays 303 to one or more ovens 308 for baking. When baking is complete, the products are removed from the ovens, as generally indicated at arrow 309, for further processing such as cutting, packaging, and transportation.

It should be appreciated that practical production lines need not function in a linear manner as illustrated and often will not have a one to one correspondence of equipment. For example, depending on the relative production capacities of the different components, different quantities of the various machines may be utilized. It is anticipated, for example, that single finishing machine 306 may feed trays to multiple ovens and a single vat 302 may feed multiple depositor machines 304. In addition, not all of the illustrated components will be necessary for every baking process. For example, a finishing machine 306 may not be required for certain products. Moreover, the layout of the line is provided by way of example. In this regard, it is not necessary, for example, that separate conveyor systems 305 and 307 be utilized. Moreover, the noted functions need not be performed by separate machines. For example, the depositor and finishing machine (as well as other elements) may be combined as components of a single machine or be otherwise contained in a single housing.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A process for use in making gluten-free baked products, comprising the steps of:
    combining whole, unground gluten-free grains and water in a vat free from any grain flours;
    mixing the grains and the water, free from any grain flours, and cooking to form a cooked grain product by simultaneously operating grinder blades in the vat to grind solids and mixer paddles in the vat to circulate the grains and water while heating the grains and the water; and
    pumping the cooked grain product from the vat to dough depositor equipment for deposition on baking surfaces.

2. A process as set forth in claim 1, wherein said process produces a product that is gluten-free, wheat-free, dairy-free and vegan.

3. A process as set forth in claim 1, wherein said cooked grain product contains one or more of organic brown rice, *quinoa*, millet, amaranth, flax seeds, chia seeds, sesame seeds or other gluten-free grains or grass.

4. A process as set forth in claim 1, wherein said grains comprise organic brown rice, *quinoa*, millet, amaranth, flax seeds, chia seeds, and sesame seeds.

5. A process as set forth in claim 1, wherein said step of combining comprises filling the vat to about 25%-29% of vat tank capacity with water and adding about 2550 pounds of grains.

6. A process as set forth in claim 5, wherein said grains include about 2000 pounds of organic, short grain brown rice and about 550 pounds of *quinoa*.

7. A process as set forth in claim 1, further comprising the step of cooking a mixture by heating said grains and water to a temperature of between about 200° F.-212° F. in connection with said mixing.

8. A process as set forth in claim 7, wherein said vat includes a steam-lined kettle having a liner surrounding a kettle, and said step of heating comprises filling said liner with steam.

9. A process as set forth in claim 1, wherein said mixing comprises operating said grinder blades at a speed of about 75 hertz and operating said paddles at a speed of about 70 hertz.

10. A process as set forth in claim 9, wherein said blades and paddles are operated at the speeds set forth in claim 9 for an initial mixing process of at least 12 minutes.

11. A process as set forth in claim 1, wherein said cooking and mixing includes an initial process where the blades are operated at a first blade speed and the paddles are operated at a first paddle speed, and a further mixing process where the blades are operated at a second blade speed and the paddles are operated at a second paddle speed, wherein the second blade speed and the second paddle speed are less than the first blade speed are first paddle speed, respectively.

12. A process as set forth in claim 11, wherein said cooking and mixing continues until white points form on ends of the brown rice kernels.

13. A process as set forth in claim 11, wherein the initial mixing process continues for about 12 minutes and the further mixing process continues for about 25 minutes.

14. A process as set forth in claim 11, wherein the first speeds are about 75 hertz for the blades and 70 hertz for the paddles, and the second speeds are about 20 hertz for the blades and about 50 hertz for the paddles.

15. A process as set forth in claim 1, further comprising the step of adding further ingredients of the baked products after said step of mixing but before said step of pumping.

16. A process as set forth in claim 15, further comprising, after said step of adding further ingredients, adding water in a series of steps to obtain a ratio of water to other ingredients, said ratio allowing the cooked grain product to resist clumping during processing.

17. A process as set forth in claim 16, wherein water is added to the cooked mixture in increments while mixing.

18. A process as set forth in claim 16, wherein the ratio is approximately 460 gallons of water for 2000 pounds of other ingredients.

19. A process as set forth in claim 18, further comprising the step of executing a final mixing and cooking process after achieving said ratio but before said pumping.

20. A process as set forth in claim 19, wherein said blades are operated at a speed of about 15 hertz and said paddles are operated at a speed of about 60 hertz during said final mixing and cooking process.

21. A process as set forth in claim 19, wherein said final mixing and cooking process continues for about 23 minutes.

22. A process as set forth in claim 1, wherein said blades and paddles continue to operate during said step of pumping.

* * * * *